Jan. 2, 1923.

C. F. JENKINS.
SLEEVE LIKE REFRACTING PRISM.
FILED FEB. 5, 1921.

1,440,466

Witnesses
Mildred M. Ames.

Inventor
C. Francis Jenkins
By
Attorneys.

Patented Jan. 2, 1923.

1,440,466

UNITED STATES PATENT OFFICE.

CHARLES FRANCIS JENKINS, OF WASHINGTON, DISTRICT OF COLUMBIA, ASSIGNOR TO DISCROLA, INC., OF WASHINGTON, DISTRICT OF COLUMBIA, A CORPORATION.

SLEEVELIKE REFRACTING PRISM.

Application filed February 5, 1921. Serial No. 442,872.

*To all whom it may concern:*

Be it known that I, CHARLES FRANCIS JENKINS, a citizen of the United States, and resident of Washington, in the District of Columbia, have invented certain new and useful Improvements in Sleevelike Refracting Prisms, of which the following is a specification, reference being had therein to the accompanying drawing.

Producing a circular prism of progressively varying cross section by shaping the lateral face of the peripheral zone of a plane glass disk is not new, but while such a construction is usable for either camera or projecting machines for motion picture work, it has an inherent defect in that sharpness is lacking in parts of the pictures. It has been found that by substituting for the prism mentioned an approximately cylindrical, sleeve-like glass band varied in radial thickness to produce a prism having the angle of its faces progressively varied, the defect mentioned is practically eliminated.

In the accompanying drawings.

Figure 1:
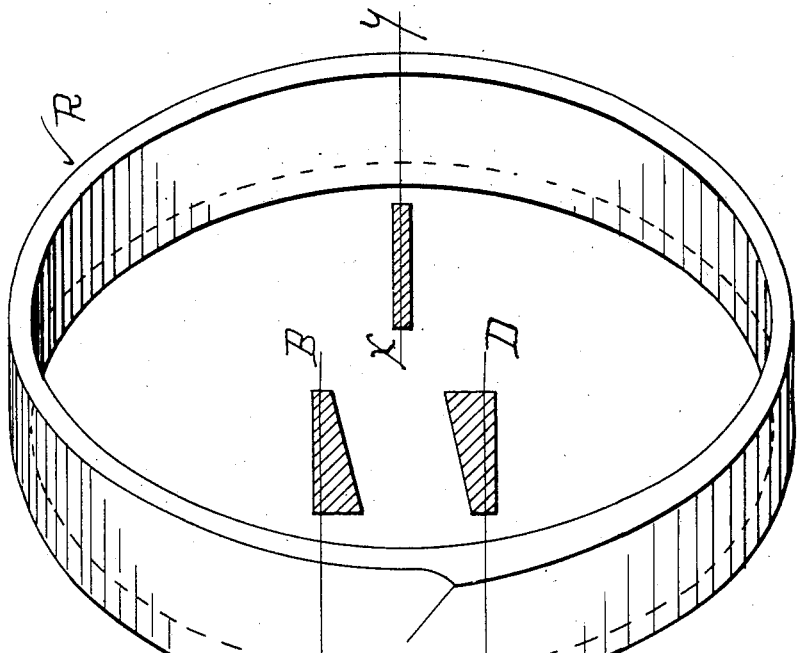
Fig. 1 is a perspective view of the novel prism.

In Figure 1, R represents an internally cylindrical ring having the thickness of its margins or ends gradually increasing and decreasing, from maximum and minimum, respectively, in passing around the curve from a certain point. The forms of the cross sections at the lines A—B, C—D, and x—y, are shown alongside those lines. The lines A—B and C—D are slightly separated, and in this space each margin changes from maximum to minimum or vice versa, while on the opposite side of the sleeve the prism faces are parallel.

Figure 2:
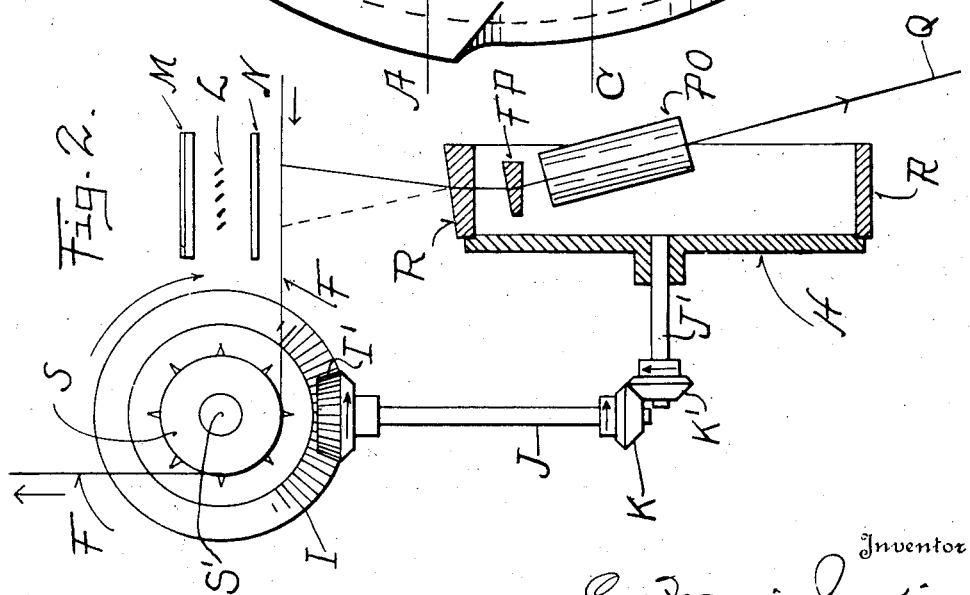
Fig. 2 is a diagrammatic view showing the prism in diametrical section and connected with other parts of a motion picture machine.

In Figure 2. F represents a picture film, S a sprocket drum fixed on a constantly rotating shaft S¹. The prism R is mounted on a suitable holder H in position to receive light rays from a source L thrown back by a mirror M through a diffusing screen N. The prism is rotated from the drum shaft by a gear I, pinion I', shaft J, gears K, K and shaft J' perpendicular to the plane of the prism R. The light beam after passing through the rotary prism to the space within it, is bent by a fixed prism FP into the axial line of a projection objective PO inclined to the plane of the prism so that the beam may pass alongside instead of through, the opposite side of the prism ring, and onward always in the fixed axial line Q to a screen,—not shown.

The prism here shown is here shown as arranged to make one complete revolution while the film advances a picture's width, but obviously the invention is not limited to such embodiment.

From the construction it follows that since the prism always bends the rays into the fixed path Q while one picture is passing and then quickly begins a repetition of the cycle of movements, the picture of the screen remains in a fixed position.

It is common knowledge that in this art projecting and camera devices are interconvertible without invention.

What I claim is:

1. An approximately cylindrical sleevelike refracting prism having one end portion of its wall progressively changed in radial thickness in passing around the sleeve and also having its wall progressively changed in radial thickness in passing from said end portion toward the opposite end portion.

2. A glass refracting prism of approximately cylindrical sleeve-like form and having its radial thickness progressively varied, in passing around the periphery, to change the angle made by the prism faces.

3. A sleeve-like refracting prism having the end portions of its wall progressively and oppositely changed in radial thickness in passing around the sleeve in the same direction and also having its wall progressively changed in radial thickness in passing from each of said end portions toward the opposite end portion.

In testimony whereof I hereunto affix my signature.

CHARLES FRANCIS JENKINS.